United States Patent [19]
Medlock

[11] 3,878,507
[45] Apr. 15, 1975

[54] SENSOR DEVICE AND ALARM CIRCUIT FOR FUEL TANKS

[76] Inventor: Homer L. Medlock, 3242 E. Hubbell, Phoenix, Ariz. 85008

[22] Filed: Apr. 15, 1974

[21] Appl. No.: 460,702

[52] U.S. Cl. ............... 340/63; 340/52 D; 340/280; 307/10 AT; 200/61.44
[51] Int. Cl. ............................................ B60r 25/10
[58] Field of Search ............ 340/52 D, 52 F, 63, 64, 340/65, 274, 280; 307/10 AT; 200/42 R, 44, 47, 61.19, 61.44

[56] References Cited
UNITED STATES PATENTS
2,019,393  10/1935  Carah ........................... 340/63 U X
3,792,435  2/1974  Pace .............................. 307/10 AT

*Primary Examiner*—Alvin H. Waring
*Attorney, Agent, or Firm*—Warren F. B. Lindsley

[57] ABSTRACT

A novel and effective device for the sensing of the presence or removal of caps from fuel tanks including automobile tanks and an alarm circuit for creating an audible sound such as the horn of the automobile when the unauthorized removal of the cap occurs.

4 Claims, 5 Drawing Figures

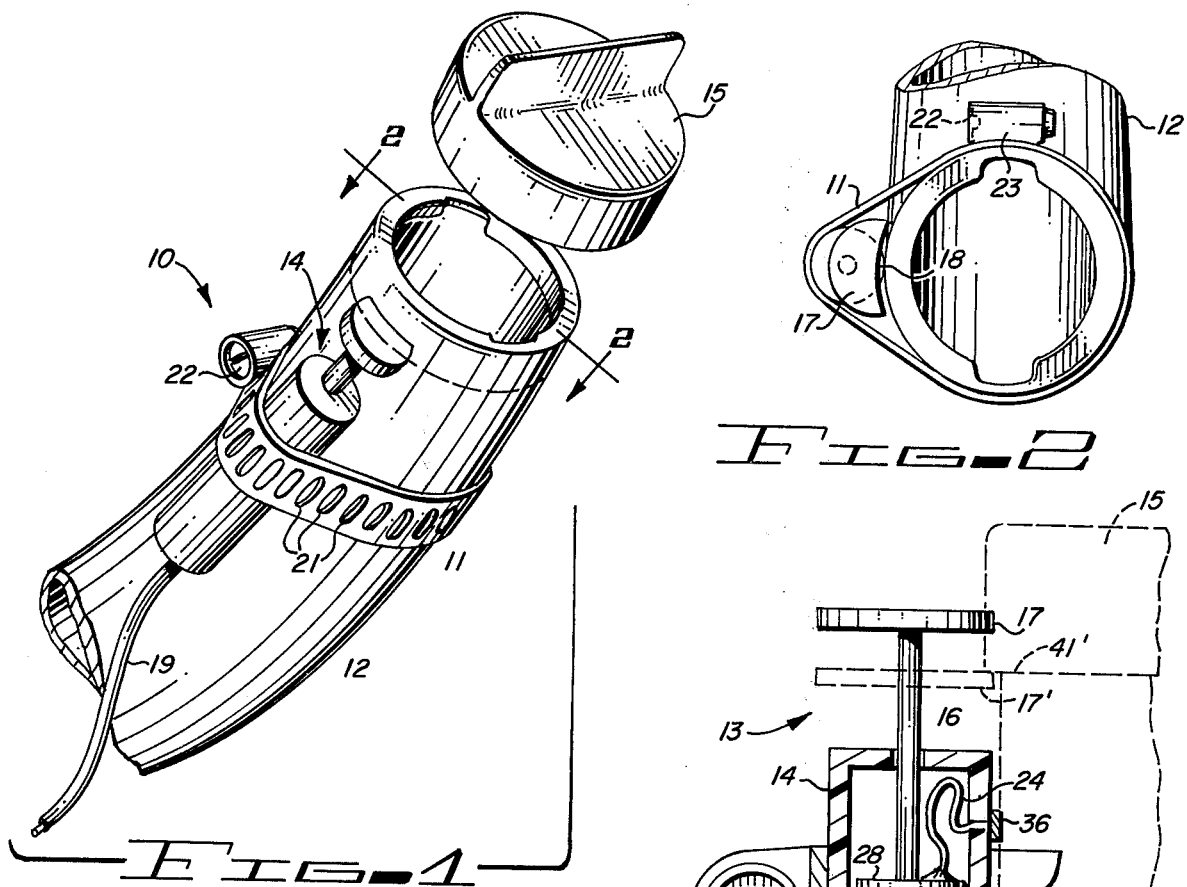
Fig-1
Fig-2
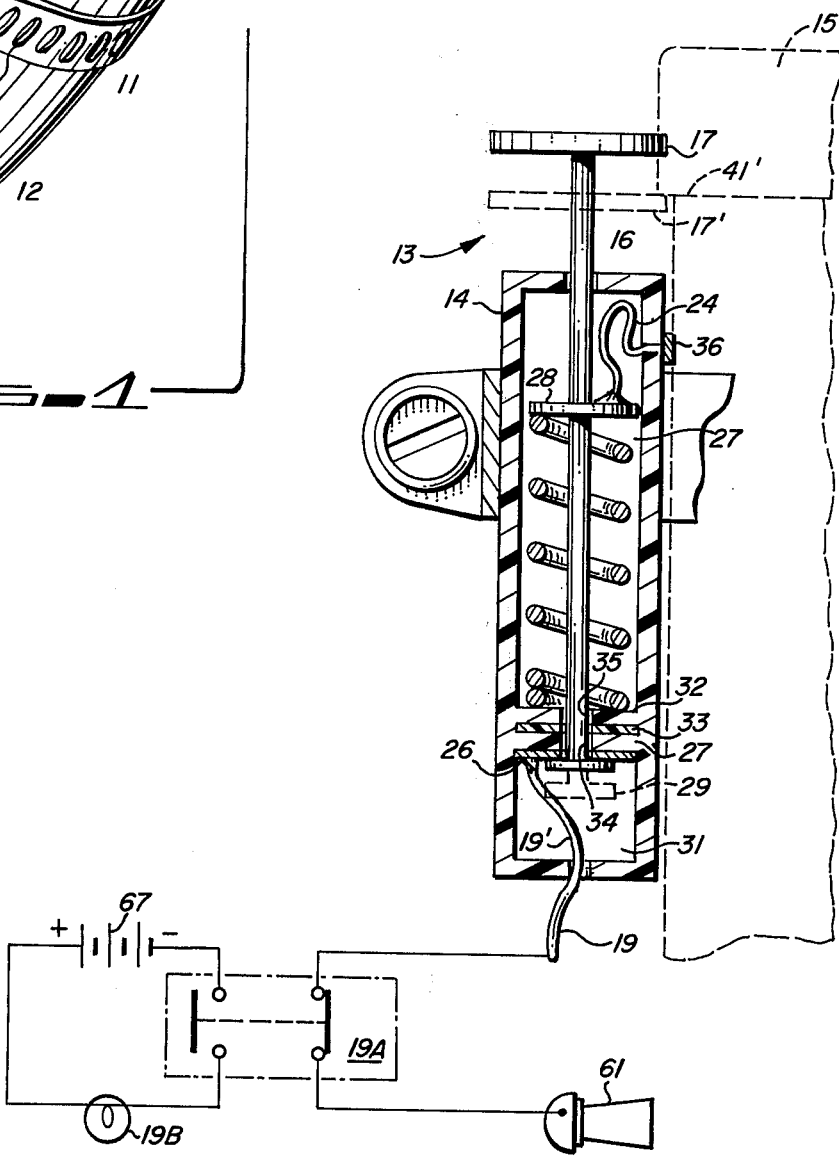
Fig-3

SENSOR DEVICE AND ALARM CIRCUIT FOR FUEL TANKS

BACKGROUND OF THE INVENTION

The rising costs and the reduced availability of gasoline have brought about a pronounced increase in the frequency of thefts involving gasoline siphoned from the tanks of parked vehicles; the same considerations have also added to the public demand for improved means to prevent or discourage such thefts.

Aside from the purely monetary interest in curbing this form of petty thievery, there is a growing public sentiment which calls for the removal of unnecessary temptations which might entice a youth to take his first steps into a pattern of criminal activity.

It is, therefore, in the public interest that new and effective means be investigated and provided for the purpose of preventing or discouraging unlawful access to the gasoline tanks of automobiles or to other fuel storage tanks.

In addition, there is separate but related needs for an alarm or a warning light which calls attention to the fact that the cap has not been replaced or that it has not been properly secured since a missing or partly secured gasoline cap results in unnecessary vaporization and spilling of the gasoline.

DESCRIPTION OF THE PRIOR ART

Locking caps have long been employed for preventing such access, but this solution is a source of inconvenience. Keys are often lost or forgotten and the locking and unlocking of such caps is a nuisance for the station attendant who serves large numbers of customers. Furthermore, if the attendant forgets to replace the cap, the monetary loss to the owner is not insignificant.

Other forms of protection have been employed to prevent access to other parts of the automobile, most of them entailing the sounding of the horn as an alarm. U.S. Pat. Nos. 2,650,354 (Joiner), 2,687,518 (Nelman), 2,921,299 (Zimmerman) and 2,935,730 (Procter) are examples of the application of this approach. None of these devices were directly applied, however, to the prevention of thefts from gasoline or other fuel tanks, and they do not address themselves to the problems entailed in such application.

SUMMARY OF THE INVENTION

In accordance with the invention claimed, a novel and effective means is provided for the discouragement of thefts from gasoline and other fuel tanks and also for use as a warning device signaling the failure of authorized persons to replace or properly secure the cap after filling the tank.

It is therefore one object of this invention to provide a novel and effective means for discouraging thefts from gasoline or other fuel tanks.

Another object of this invention is to provide an apparatus which utilizes the horn of the automobile or an alarm of another type as a means for discouraging such thefts.

A further object of this invention is to provide along with such means and apparatus a capability for calling attention to the failure of authorized persons to replace or properly secure the cap after filling the tank.

A still further object of this invention is to provide such a means or apparatus in a form which does not constitute a fire or explosion hazard.

A still further object of this invention is to provide such a means and apparatus in a form which is simple and inexpensive and adaptable for use on new or old automobiles or on various other storage tanks.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of a sensing device attached to the filling pipe of an automobile gasoline tank, the sensing device shown comprising a specially-designed switch utilized in a first embodiment of the invention.

FIG. 2 is a second view of the filling pipe and attached device taken along line 2—2 of FIG. 1.

FIG. 3 is a cross-sectional view of the device of FIGS. 1 and 2.

DESCRIPTION OF THE PREFERRED EMBODIMENT

Figure 4:
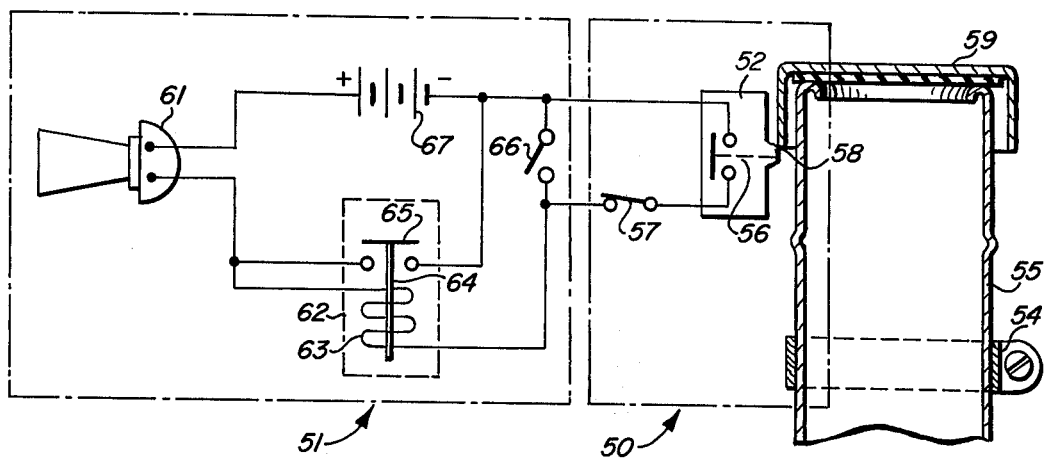
FIG. 4 is a cross-sectional view of a different type of sensing device shown coupled to the horn circuit of an automobile.

FIG. 1 illustrates a sensing device 10 attached by means of an ordinary aircraft type screw-clamp 11 to the gasoline filling pipe 12 of an automobile, device 10 being appropriately located and oriented relative to the filling pipe 12 so that a piston-like plunger 13 mounted in an insulating cylindrical housing 14 and extending from one end thereof is engaged by the gasoline cap 15 when the cap 15 is installed in place on pipe 12.

The general external form of device 10, as shown in FIGS. 1 and 2, is cylindrical with a diameter several times smaller than that of pipe 12. Plunger 13 extending from the upper end of device 10 includes a shaft 16 capped by a flat disc 17, the disc 17 being generally circular and concentrically oriented relative to shaft 16. The generally circular form of disc 17 is broken by an arcuate cutout portion forming an arcuate periphery 18 on the remaining portion having an appropriate diameter to conform closely to the cylindrical outer surface of filling pipe 12. Extending from the lower end of device 10 is an insulated electrical conductor 19 which may be connected to a double pole, single throw dash board switch 19A having one normally closed and one normally open contact. When switch 19A is closed, the circuit to the car horn hereinafter explained is closed and the circuit to a dash board light 19B completed and vice versa when switch 19A is opened.

Device 10 is secured against the side of pipe 12 in parallel alignment therewith by means of an aircraft type clamp 11. Clamp 11 is fashioned from a flexible steel strap which is perforated by a series of transverse slots 21. Rotatably secured to one end of clamp 11 is a tightening screw 22. To install clamp 11, it is first wrapped around pipe 12 and cylindrical housing 14 of device 10, and the end of clamp 11 opposite screw 22 is inserted through an opening 23 adjacent screw 22, the opening being so arranged relative to screw 22 as to cause slots 21 to be engaged by the threads of screw 22. Screw 22 is then turned in engagement with slots 21 thereby drawing the end of clamp 11 into opening 23 until it is drawn up tightly about pipe 12 and device 10.

The internal components of device 10, as shown in the cross-section view of FIG. 3 includes a portion of shaft 16, ground conductor element 24 fixedly attached at one end thereto and terminating outside of housing 14, coil spring 25 and a lead-in connector 19' of conductor 19 connected to a metallic connector 26" formed on a transverse wall 27 of the cylindrical housing 14.

Shaft 16 is provided with a disc-shaped shoulder 28 fixedly arranged between its ends and terminating at its lower extremity, as shown in FIG. 3, in a contact head 29 of a smaller size than shoulder 28.

As shown in FIG. 3, housing 14 is divided into two compartments comprising an upper compartment 30 and a lower compartment 31. The upper compartment 30 is separated from the lower compartment 31 by transverse walls 27 and 32, separated from each other by a juxtapositioned Neopreme seal 33.

Shaft 16 of plunger 13 passes through clearance holes 34 and 35 located at the axial centers of transverse walls 27 and 32 of housing 14, respectively, with contact head 29 being positioned within compartment 31 just below wall 27.

Spring 25 surrounds shaft 16 inside of compartment 30 and is confined therein between shoulder 28 of shaft 16 and the upper surface of wall 32.

Ground contact element 24 is located within upper compartment 30. It is attached to the electrically nonconductive outer wall of the cylindrical housing 14 of device 10 through which it passes to be terminated in a contact button 36. Inside compartment 30, ground element 24 makes electrical contact with shaft 16.

The solid line representation of plunger 13 shows its position within device 10 when no external forces are applied to plunger 13. In this instance, spring 25 forces contact head 29 against the lower surface of metallic connector 26 so that plunger 13 is extended externally upwardly from device 10 in its maximum extended position.

When cap 15 is installed in place, however, the lower edge 41 of cap 15 bears against the upper surface of disc 17 forcing plunger 13 downwardly against the force of coil spring 25, the disc 17 now taking the position outlined by its broken line representation 17'; and contact head 29 now breaking electrical contact with lead in conductor 19'. An electrical circuit is now broken with conductor 19.

If cap 15 is removed, plunger 13 is again forced upwardly by spring 25 forming an electrical contact between connector 26 and plunger 13.

Device 10 thus serves as a sensing device with a capability of indicating by means of a closed or open circuit between conductor 19 and ground the presence or absence of cap 15 in its installed position on pipe 12. The application of device 10 as a part of this invention will be described later in connection with the circuits of FIGS. 4 and 5.

It should be recognized that conductor 26 may comprise any form of conductive member such as a brass washer firmly fitted into an insulating cylindrical housing 10' of device 10 with lead in conductor 19' directly connected thereto as illustrated, or any suitable form of conductive point.

While device 10 is adequate and safe for application under properly controlled conditions, since the making and breaking of the electrical contacts occur in the isolated compartment 31, the use of hermetically sealed electrical contacts is preferred for reasons of safety when used in the presence of volatile and explosive fuels such as gasoline. For this reason, a hermetic switch is employed as an alternate sensing device in the embodiments of the invention illustrated in FIGS. 4 and 5.

FIG. 4 illustrates a gas-cap alarm circuit 50 connected to the horn circuit 51 of an automobile, the alarm circuit 50 comprising a normally closed hermetically sealed micro switch 52 which may be attached by means of a bracket not shown and a clamp 54 to gasoline tank filling pipe 55. Serially connected with internal contacts 56 of micro switch 52 and included as an element of alarm circuit 50 is a disable switch 57.

Protruding from one face of micro-switch 52 is a small plunger 58 which is depressed to open switch 52. As shown in FIG. 4, switch 52 is appropriately oriented and positioned relative to pipe 55 so that plunger 58 extends perpendicularly toward the outer surface of pipe 55 in a location relative to the end of pipe 55 corresponding to the inside or open edge of gas-cap 59. The spacing between plunger 58 and pipe 55 is adequate to allow plunger 58 to be fully extended when cap 59 is not in place, but when cap 59 is in its fully secured position the outer surface of cap 59 depresses plunger 58 thereby opening contacts 56.

Horn circuit 51 which is typical of those employed in automobiles comprises a horn 61, a solenoid 62 having a coil 63, an armature 64 and contacts 65, a horn switch 66 and the storage battery 67. The horn circuit 51 is normally operated by depressing the horn button which closes horn switch 66. When switch 66 closes an electrical circuit is completed beginning at the positive terminal of battery 67 and continuing through horn 61, coil 63 and switch 66 to the negative terminal of battery 67. Current flowing in this circuit through coil 63 energizes solenoid 62, thereby pulling armature 64 upward into coil 63 and closing contacts 65. Horn 61 is now directly coupled through contacts 65 to battery 67 and thus operates delivering its audible warning signal.

As shown in FIG. 4, contacts 56 of switch 52 and the serially connected disable switch 57 are connected in parallel with horn switch 66. The closing of both of these switches, 32 and 57 will thus produce the same effect, i.e., the sounding of horn 61 as has been shown for the closing of horn switch 66. It follows then, that if disable switch 57 is closed, the removal of cap 59 which allows contacts 56 of micro switch 52 to close will cause horn 61 to sound.

The warning thus produced will either aid in the aprehension of the would-be thief or it will frighten him away and discourage any future attempts.

The circuit of FIG. 4 is free of any explosion hazard related to the operation of switch 52 by virtue of the hermetic design of switch 52 wherein the contacts 56 are sealed inside a gas-tight enclosure. The disable switch 57 located inside the automobile remote from the gasoline tank where a hermetically sealed switch is probably not required. Switch 57 is opened by the owner of the vehicle when he wishes to disable the operation of the alarm circuit 50 to permit authorized access to the gasoline tank and as shown in FIG. 3 can simultaneously close a circuit to a dash board light to indicate that the alarm circuit is open.

The simple alarm circuit of FIG. 4 will serve adequately in most applications, but under certain circumstances it may be desirable to provide a latching function which causes the alarm to continue sounding once it has been initiated until the circuit has been reset from inside the automobile. In the case of alarm circuit 50, for example, if the cap 59 is partially removed and the horn begins to sound the cap may be quickly returned to halt the alarm. Such a brief burst from the horn will likely not attract attention and the forewarned intruder may then find a way to disable the sensor by holding the plunger in its depressed position using a twig or a piece of cardboard while he completes his theft. The circumvention of the alarm circuit in such a manner will be thwarted if a latching feature is incorporated which makes it impossible to halt the alarm by replacing the cap or depressing the micro-switch plunger.

Figure 5:
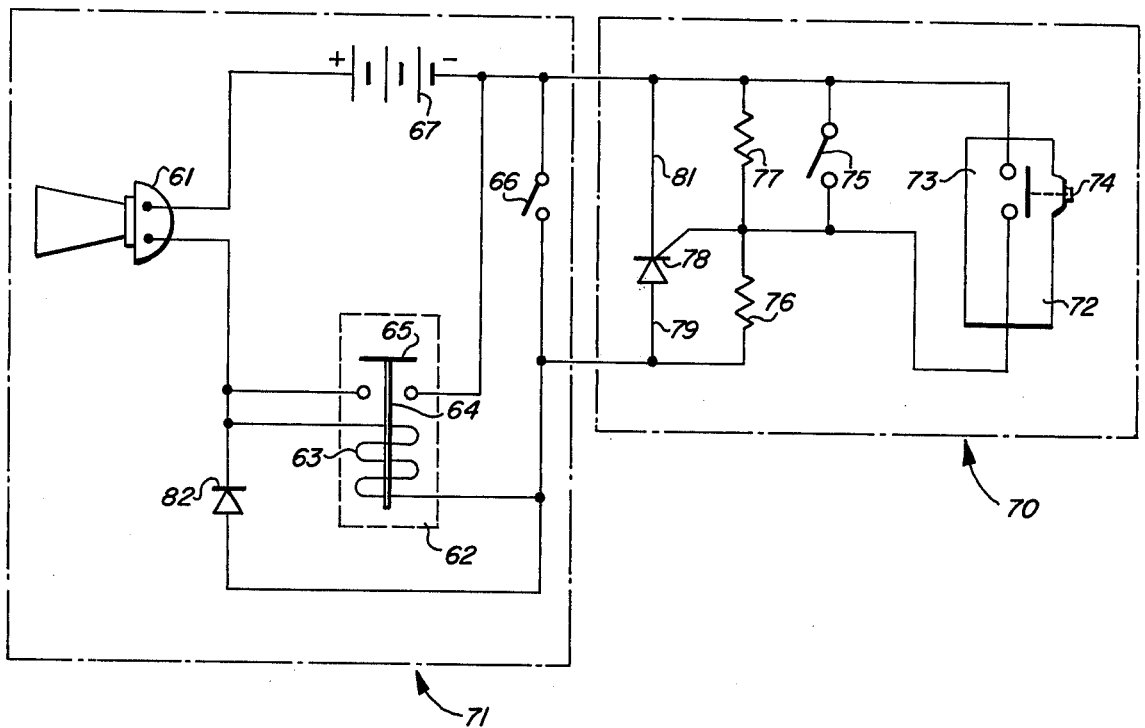
FIG. 5 is a schematic representation of another embodiment of the invention.

A modification of the circuit of FIG. 4 with a latching capability incorporated is shown in FIG. 5 where a latching alarm circuit 70 is connected to a horn circuit 71.

Latching alarm circuit 70 comprises a hermetically sealed micro-switch 72 having a set of normally-open contacts 73 and a plunger 74, an alarm disable switch 75, resistors 76 and 77 and controlled rectifier 78.

Controlled rectifier 78 is a semiconductor device having an anode 79, a cathode 81 and a gate 82. Controlled rectifier 78 blocks current flow from cathode 81 to anode 79 and it either permits or prevents current flow from anode to cathode depending upon its state. If gate 82 is at zero volts or at a small negative voltage relative to cathode 81 when a positive voltage is applied to anode 79 current flow from anode 79 to cathode 81 is blocked by rectifier 78. If a momentary positive voltage is then applied to gate 82, rectifier 78 will switch to its "on" state in which current flows readily from anode 79 to cathode 81. Controlled rectifier 78 remains in the "on" condition until the current flow is interrupted by an external means such as by the opening of a series switch or by momentarily introducing a short circuit in parallel with rectifier 78.

Horn circuit 71 is identical to horn circuit 51 of FIG. 4 with the exception that in circuit 71 a recovery diode 82 has been added across solenoid coil 63 to suppress transient voltages otherwise appearing across coil 63 when horn switch 66 is opened. Such transients might tend to trigger alarm circuit 70 when the horn is operated in its normal use. The use of diodes in this manner to suppress transients across inductive elements is well-known and commonly employed.

The operation of alarm circuit 70 in conjunction with horn circuit 71 occurs as follows: When plunger 74 is closed by virtue of the presence of gas cap 59 on pipe 55 in a physical arrangement identical to that shown in FIG. 4, contacts 73 will be closed. Alarm circuit 70 is then enabled by opening disable switch 75. Under this condition a very low value of current flows from the positive terminal of battery 67 through horn 61, coil 63, resistor 76 and contacts 73 to the negative terminal of battery 67. The small amount of current flowing due to the high value of resistance of resistor 76 is too low to actuate solenoid 62, and by virtue of the closed contacts 73, which are connected directly across gate 82 and cathode 81 of controlled rectifier 78, the voltage appearing at gate 82 is zero. Rectifier 78 thus remains in its non-conducting or "off" condition under these circumstances.

If cap 59 is now removed, thereby releasing plunger 74, contacts 73 open permitting current from resistor 76 to flow through 77 thus raising the voltage at gate 82 to a value which triggers controlled rectifier 78 to its "on" condition. In its "on" condition, controlled rectifier 78 constitutes a closed switch directly in parallel with horn switch 66. Solenoid coil 63 is thus energized through rectifier 79, contacts 65 are closed and horn 61 is energized as explained earlier in connection with FIG. 4. In this case, however, replacement of cap 59 and the return of contacts 73 to the closed position will not restore controlled rectifier 78 to its "off" condition to terminate the alarm. The alarm may be terminated by momentarily depressing the horn button to close switch 66, thereby momentarily reducing current through controlled rectifier 79 to zero, but this is not readily accomplished by the intruder if the automobile is locked, and his fear of discovery will induce him to flee rather than attempt seriously to disable the alarm when he finds it in a latched condition.

It will be recognized that certain obvious modifications to the circuit of FIGS. 4 and 5 are possible without significantly altering their operation or effectiveness. In the circuit of FIG. 5, for example, the normally open switch 72 connected in parallel with resistor 77 may be replaced by a normally closed sensor switch connected in series with resistor 76. With the cap 59 in place the normally closed switch in series with resistor 76 would be opened to prevent current flow through resistor 27 and thus to sustain the "off" condition of controlled rectifier 78 until the cap 59 is removed.

The circuit of FIG. 5 is also ideally suited for the application of sensor 10 of FIGS. 1, 2 and 3 as a direct substitution for micro-switch 72. Because of the very low current carried by the switch in its closed condition and because of the very low voltage appearing across the contacts when they are opened, there will be insufficient energy present in a properly designed circuit of this configuration to ignite the volatile gas.

It is also recognized that the application of the invention may be readily applied to prevent vandalism in connection with various other storage tanks and it may be applied as well to warn of the improper or incomplete replacement of caps in the normal servicing of such storage facilities.

Although but a few embodiments of the present invention have been illustrated and described, it will be apparent to those skilled in the art that various changes and modifications may be made therein without departing from the spirit of the invention or from the scope of the appended claims.

What is claimed is:

1. A warning device for fuel tanks having associated battery, alarm device and circuitry including an alarm switch comprising in combination:
   an electric switch comprising a housing, a spring biased plunger mounted therein for making and breaking a pair of electrical contacts therein,
   means for mounting said switch on a fuel tank fill pipe juxtapositioned to its cover,
   said plunger being arranged to extend outwardly of said housing into the path of movement of said cover when said cover is mounted on the fill pipe, means for connecting said electrical contacts of the warning device electrically across the contacts of the alarm switch of the alarm device, a control switch connected in series with said electrical contacts of said warning device to selectively interupt the circuit to the alarm device, said electric switch comprising a hermetically sealed micro-switch, and a controlled rectifier having an anode, a cathode and a gate, said anode and cathode being connected in series across the alarm switch of the alarm device, and said gate being connected in series with said electrical contacts of said electric switch, whereby the associated circuitry of the alarm circuit is energized upon movement of the cover of the fuel tank with reference to the fill tank.

2. A warning device for use on the gasoline fuel pipe of an automobile and the automobile's associated battery, horn and associated circuit including the horn switch comprising in combination:

an electric switch comprising a housing, a spring biased plunger mounted therein for making and breaking a pair of electrical contacts therein, means for mounting said switch on automobile's fuel tank fill pipe juxtapositioned to its cover, said plunger being arranged to extend outwardly of said housing into the path of movement of said cover when said cover is mounted on the fill pipe, means for connecting said electrical contacts of the warning device electrically across the contacts of the horn switch of the automobile's horn, a control switch connected in series with said electrical contacts of said warning device to selectively interrupt the circuit to the horn, said electric switch comprising a hermetically sealed micro-switch, and a controlled rectifier having an anode, a cathode, and a gate, said anode and cathode being connected in series across the alarm switch of the alarm device, and said gate being connected in series with said electrical contacts of said electric switch, whereby the associated circuitry of the alarm circuit is energized upon movement of the cover of the fuel tank with reference to the fill tank.

3. The warning device set forth in claim 2 wherein: said control switch is connected across said gate and said cathode of said controlled rectifier.

4. The warning device set forth in claim 1 wherein: said control switch selectively interrupts the circuit to the alarm device and substantially simultaneously completes a circuit to a signal light.

* * * * *